June 21, 1960 W. D. LEWIS 2,942,192
HIGH SPEED DIGITAL DATA PROCESSING CIRCUITS
Filed Oct. 11, 1956 5 Sheets-Sheet 1
FIG. 1
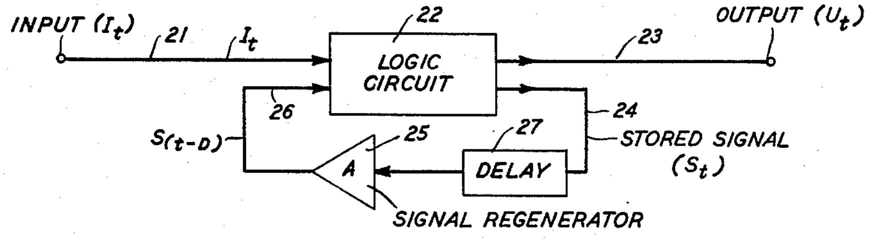
FIG. 2
| INPUT SIGNALS | | OUTPUT SIGNALS | |
|---|---|---|---|
| COUNT SIGNAL ($I_t$) | SIGNAL FROM STORAGE ($S_{(t-D)}$) | SIGNAL OUTPUT ($U_t$) | SIGNAL TO STORAGE ($S_t$) |
| 0 | 0 | 0 | 0 |
| 0 | 1 | 0 | 1 |
| 1 | 0 | 0 | 1 |
| 1 | 1 | 1 | 0 |
FIG. 3
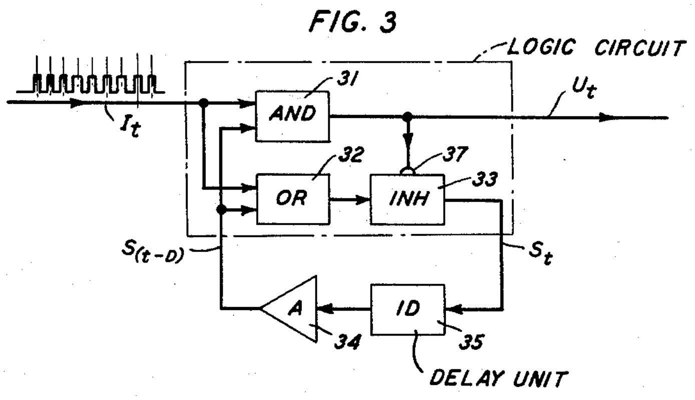
INVENTOR
W. D. LEWIS
BY Alan C. Rose
ATTORNEY

HIGH SPEED DIGITAL DATA PROCESSING CIRCUITS

Filed Oct. 11, 1956 5 Sheets-Sheet 2

INVENTOR
W. D. LEWIS
BY Alan C. Rose
ATTORNEY

| INPUT SIGNALS | | | | OUTPUT SIGNALS | |
|---|---|---|---|---|---|
| $I_t$ | $I_{(t-D)}$ | $I_{(t-2D)}$ | $I_{(t-3D)}$ | $U_t$ | $S_t$ |
| 0 | 0 | 0 | 0 | 0 | 0 |
| 0 | 0 | 0 | 1 | 0 | 1 |
| 0 | 0 | 1 | 0 | 0 | 1 |
| 0 | 0 | 1 | 1 | 0 | 0 |
| 0 | 1 | 0 | 0 | 0 | 1 |
| 0 | 1 | 0 | 1 | 0 | 0 |
| 0 | 1 | 1 | 0 | 0 | 0 |
| 0 | 1 | 1 | 1 | 0 | 1 |
| 1 | 0 | 0 | 0 | 0 | 1 |
| 1 | 0 | 0 | 1 | 1 | 0 |
| 1 | 0 | 1 | 0 | 1 | 0 |
| 1 | 0 | 1 | [illegible] | 0 | 1 |
| 1 | 1 | 0 | 0 | 1 | 0 |
| 1 | 1 | 0 | 1 | 0 | 1 |
| 1 | 1 | 1 | 0 | 0 | 1 |
| 1 | 1 | 1 | 1 | 1 | 0 |

| INPUT SIGNALS | | | OUTPUT SIGNALS | |
|---|---|---|---|---|
| $R_t$ | $I_t$ | $S_{(t-D)}$ | $S_t$ | $U_t$ |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 0 |
| 1 | 0 | 1 | 0 | 0 |
| 1 | 1 | 0 | 0 | 0 |
| 1 | 1 | 1 | 0 | 0 |

INVENTOR
W. D. LEWIS
BY
Alan C. Rose
ATTORNEY

INVENTOR
W. D. LEWIS
BY Alan C. Rose
ATTORNEY

June 21, 1960 W. D. LEWIS 2,942,192

HIGH SPEED DIGITAL DATA PROCESSING CIRCUITS

Filed Oct. 11, 1956 5 Sheets-Sheet 5

INVENTOR
W. D. LEWIS
Alan C. Rose
ATTORNEY

United States Patent Office 2,942,192

Patented June 21, 1960

2,942,192

HIGH SPEED DIGITAL DATA PROCESSING CIRCUITS

Willard D. Lewis, Mendham, N.J., assignor to Bell Telephone Laboratories, Incorporated, New York, N.Y., a corporation of New York Filed Oct. 11, 1956, Ser. No. 615,364

14 Claims. (Cl. 328—92)

This invention relates to digital data processing or computer circuits and more particularly to circuits of this type which include a regenerative storage loop.

For specific example, consider a simple count-down circuit which produces one output pulse for every two pulses applied to it. The pulses applied to the input of the count-down circuit are in the form of a train of pulses, and they may appear in successive time intervals designated "digit periods." The logic circuit which performs the count-down function includes a regenerative storage loop. Upon the arrival of the first input pulse, a pulse is applied to the storage loop. When the second pulse arrives concurrently with the return of the stored pulse, however, an output pulse is produced, and no pulse is applied to the storage loop. As additional pulses are received, the foregoing cycle is repeated.

In the example given in the preceding paragraph, it was assumed that the regenerative storage loop included exactly one digit period of delay. However, it is sometimes necessary or desirable to use pulse regenerators having more than one digit period of delay. In the past, this generally has required a reduction in the rate at which data is processed to that at which pulses are circulated through the regeneration loop. Thus, for example, if the pulse regenerator employed in the illustrative count-down circuit mentioned above introduces two microseconds of delay, the circuit could only receive pulses at a rate of one pulse every two microseconds, even if the logic circuit per se introduces no delay.

Accordingly, the principal object of the present invention is to increase the operating speed of logic circuits including regenerative storage loops.

Logic circuits including regenerative storage loops may be instrumented in accordance with the invention to process data with a digital repetition period which is a fraction of the delay of the storage loop by effectively reconstructing the signals which are in the storage loop. This is accomplished by applying input signals to a composite logic circuit both directly and after one or more successive delay intervals which are approximately equal to digit periods.

I have discovered that by the foregoing technique, the limitations of regenerative storage delay may be overcome, and that data may be received and processed in successive digit periods notwithstanding the use of a regenerative storage loop including many digit periods of delay. The validity of the foregoing statement is most readily demonstrated in connection with the illustrative logic circuits shown in the drawings, which will be described in detail hereinafter. From an intuitive standpoint, however, it can be seen that a composite logic circuit can produce the desired output if the following signals are available: (1) the undelayed input signal, (2) the input signal delayed by integral digit periods, and (3) the stored signal delayed by more than one digit period. First, it is clear that if one could obtain the stored signal delayed by one digit period, it could be combined with the present input signal to give the desired output signal and the next stored signal. By direct analogy, the signal applied to a storage loop in any past digit period can be combined with the signal input from the next more recent digit period to produce the signal applied to storage in that more recent digit period. Accordingly, starting with a stored signal several digit periods old, one can derive the signal stored one digit period ago, and this can be combined with the present input signal to produce the required output.

An advantage of the invention is the relatively brief time period between the application of input signals to the logic circuitry and the appearance of output information. Despite the delays included in some of the input circuits and the delay of two or more digit periods in the regenerative storage loop, the delay between input and output circuits is only that of some high speed logic circuitry, and is therefore only a fraction of a digit period.

Accordingly, it is a feature of this invention that a logic circuit having a regenerative loop with an inherent delay greater than one digit period of the input information also comprise logic circuits which operate on the input information during each digit period up until the period of delay of the regenerative loop and which utilize the results of these operations to formulate the output information. Accordingly, even though the regeneration requires a delay greater than one digit period of the information, a proper output is obtained during each digit period. The first of these output signals, until the digit period equal to the regenerative delay, will, of course, not be regenerated by the circuit. But thereafter each signal will be regenerated.

It is another feature of this invention that a logic circuit including a regenerative storage loop having a delay greater than a single digit period of the input information also include logic circuits which continuously provide storage signals for each of the digit periods less than the delay of the regenerative loop.

In accordance with further features of this invention and in accordance with specific illustrative embodiments thereof, individual logic circuits are employed to provide the intermediate store signals during the period of the delay of the regenerative loop and the output of these circuits is applied, together with the current or present information input signal, to a final logic circuit which provides the output signal.

A complete understanding of this invention and of the features thereof may be gained from consideration of the following detailed description and the accompanying drawings, in which:

Fig. 1 is a generalized circuit diagram of a logic circuit including a regenerative storage loop, as is known in the art;

Fig. 2 is the definitive specification, or "truth table," of a simple logic circuit for performing a count-down operation;

Fig. 3 is a logic circuit of a type known in the art for instrumenting the table of Fig. 2;

Figure 4:
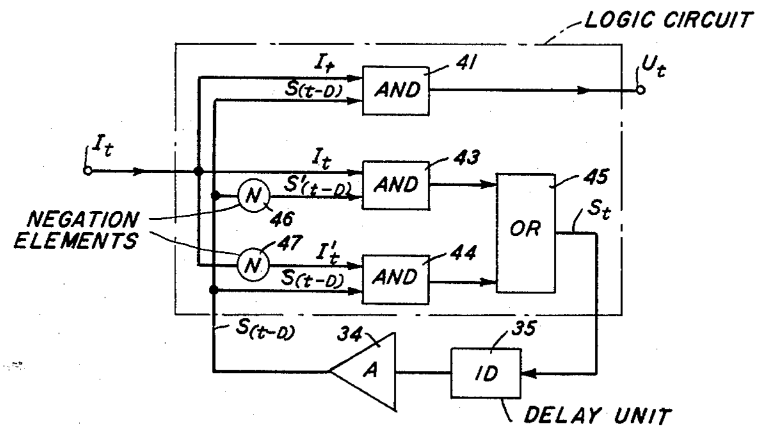
Fig. 4 is an alternative circuit of a type known in the art which also performs the operations specified in the table of Fig. 2.

With reference to the drawings, Fig. 1 illustrates a generalized digital data processing circuit including a regenerative storage loop. Digital signals are applied to lead 21 in successive digit periods. In response to the applied input signals, output signals $U_t$ and signals ($S_t$) to be stored are produced by the logic circuit 22 at leads 23 and 24, respectively. A signal regenerator 25 is connected between the storage output lead 24 and the storage input lead 26 to the logic circuit 22. The delay unit 27 represents the delay of the storage loop including the logic circuit 22, the regenerator 25, and any additional delay which may be required to synchronize the arrival of pulses at leads 21 and 26.

The circuit 22 may include logic elements such as "AND" units, "OR" units, or "inhibit" units to accomplish any of a wide variety of functions. These logic circuits are well known in the art and are discussed, for example, in a book entitled "High-Speed Computing Devices," by Engineering Research Associates, McGraw-Hill Book Co., Inc., 1950, and in an article by S. H. Washburn entitled "An Application of Boolean Algebra to the Design of Electronic Switching Circuits," which appeared at pages 380 through 388 of The Transactions of the A.I.E.E., part I, Communications and Electronics, volume 72, September, 1953.

To illustrate the principles of the invention, we will again refer to the simple count-down circuit mentioned above. The logic circuit of Fig. 1 has two inputs $I_t$ and $S_{(t-D)}$, and two outputs $U_t$ and $S_t$ (assuming negligible delay in the logic circuit). To realize a simple count-down circuit, one pulse must appear at $U_t$ for every two input pulses. Thus, when the first pulse is applied to the logic circuit 22, no pulse appears at $U_t$ but a pulse is applied to the storage output $S_t$. When the next pulse appears at $I_t$ concurrently with a pulse from storage at $S_{(t-D)}$, a pulse appears at the output circuit $U_t$ but no pulse is applied to storage. In addition, if no input pulse $I_t$ appears during a given digit period, the stored pulse is merely recirculated.

The definitive specification of the foregoing desired mode of operation in terms of binary input and output signals is set up in a table in Fig. 2. This type of a table for logic circuits is termed a "truth table." In the table of Fig. 2, the binary symbols "0" and "1" represent the two possible different input signals. In the present circuits the symbols "1" and "0" correspond to the presence or absence, respectively, of pulses in successive digit periods, or time slots. In other systems, positive and negative pulses have been employed to represent the binary symbols "1" and "0," respectively.

Fig. 3 is a logic circuit for implementing the "truth table" of Fig. 2. The logic circuit of Fig. 3 includes the AND unit 31, the OR unit 32, and the inhibit unit 33. The storage loop associated with the circuit of Fig. 3 includes the regenerator 34, and the loop delay is one digit period, as indicated by the symbol "1D" in the block 35.

When the first pulse appears at $I_t$ in Fig. 3, it is passed through the OR unit 32 and the inhibit unit 33 and is applied to the storage loop at $S_t$. With no pulse appearing from storage at $S_{(t-D)}$, the AND unit 31 is not energized and no output pulse appears at $U_t$. When the second pulse arrives, however, pulses are present at both $I_t$ and $S_{(t-D)}$. The AND unit 31 is therefore energized, and a pulse appears at $U_t$. In addition, the output pulse from the AND unit 31 is applied to the inhibiting terminal 37 of the inhibit unit 33, and pulses are blocked from the storage output $S_t$.

The use of Boolean algebra as described in the Washburn article cited above is another powerful technique for analyzing and constructing binary logic circuits. In Boolean algebra and AND circuit function is symbolized by a product and an OR circuit function is symbolized by an addition. Boolean algebra also requires the negative of the binary function, and this is symbolized by primed designations. Following the foregoing pattern, the Boolean expression for the output $U_t$ of a count-down circuit is as follows:

$$U_t = I_t S_{(t-D)} \tag{1}$$

This means that there is an output pulse when both $I_t$ and $S_{(t-D)}$ are present. In Fig. 4, which is another logic circuit for implementing the "truth table" of Fig. 2, this function is implemented by the AND unit 41. The Boolean algebraic expression for the stored signal $S_t$ is as follows:

$$S_t = I_t' S_{(t-D)} + I_t S'_{(t-D)} \tag{2}$$

This means that there will be a stored signal $S_t$ when $I_t$ is not present (note the prime on the symbol $I_t$) and when $S_{(t-D)}$ is present, or when $I_t$ is present and $S_{(t-D)}$ is not present. The Boolean expression (2) is instrumented by the AND units 43 and 44, and by the OR unit 45 in Fig. 4. The negation elements 46 and 47 are employed to obtain the binary functions $S'_{(t-D)}$ and $I'_t$, respectively.

In Fig. 4, as in Fig. 3, the amplifier 34 and the delay unit 35 complete the regenerative storage delay loop. It should also be noted that Figs. 3 and 4 both perform the same logic function, although they are instrumented somewhat differently.

Figure 5:
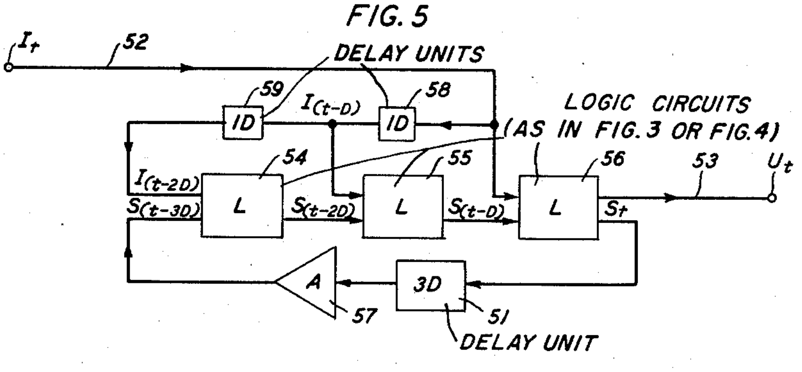
Fig. 5 is a block circuit diagram of a logic circuit in accordance with the invention in which the regenerative storage loop includes more than one digit period of delay.

Fig. 5 illustrates a circuit in accordance with the invention in which the regenerative storage loop includes more than one digit period of delay. This extra delay may result from the delay introduced by the pulse regenerator which may, for example, be a traveling wave tube amplifier. The storage loop of Fig. 5 has three digit periods of delay, as indicated by the symbol "3D" in the logic block 51. Input signals $I_t$ are applied on lead 52 and the output signals $U_t$ appear at lead 53. The circuit shown in Fig. 5 performs the same count-down function which has been described above in connection with Figs. 1 through 4 despite the three digit periods of delay in the regenerative storage loop. This is accomplished by the use of three logic circuits 54, 55, and 56, each of which performs the logic function tabulated in Fig. 2. Accordingly, the circuits 54, 55, and 56 may each be identical with the circuit of Fig. 3 or that of Fig. 4, except that no output signal corresponding to $U_t$ is taken from circuits 54 or 55. The storage input and output circuits of the three logic circuits 54, 55, and 56 are connected in a series loop with the digit regeneration circuit 57 and its associated delay unit 51. The input signals on lead 52 are connected directly to one of the logic circuits 56. The one-digit delay unit 58 is connected between the input lead 52 and the signal input lead of logic circuit 55. An additional digit period of delay is provided by the delay unit 59 which is connected from the output of the delay unit 58 to the signal input of the logic circuit 54.

It has been shown in connection with Figs. 1 through 4 that the logic circuits of Figs. 3 and 4 produce an output $S_t$ when the signals $I_t$ and $S_{(t-D)}$ are applied to their input leads. Stated more generally, this means that the stored signal for a given digit period is produced when the input signal for the same digit period and the stored signal from the previous digit period are applied to the input of the logic circuit. Now, referring to Fig. 5, it may be seen that $I_{(t-2D)}$ is applied to the signal input of logic circuit 54, and $S_{(t-3D)}$ (the stored signal delayed by three digit periods) is applied to the storage input of logic circuit 54. Accordingly, therefore, the signal $S_{(t-2D)}$ appears at the storage output of the logic circuit 54. Similarly, with $I_{(t-D)}$ and $S_{(t-2D)}$ applied to the input leads of the logic circuit 55, the stored signal $S_{(t-D)}$ appears at the output lead of logic circuit 55, which is also the storage input lead of the logic circuit 56.

The full and surprising significance of the analysis of the foregoing paragraph is that the signal which was applied to the storage loop only one digit period ago and which will not appear at the output of the loop for two more digit periods has now been reconstructed. With $I_t$ applied to the signal input and $S_{(t-D)}$ applied to the storage input of logic circuit 56, the output signal $U_t$ is clearly obtained with no more delay than was present in circuits 3 and 4.

It is obvious that the circuit of Fig. 5 may be extended to situations in which the regenerative storage loop includes more than three digit periods of delay. In addition, the circuit of Fig. 5 may readily be modified to accommodate slight delays in the logic circuits 54, 55, and 56. This could be accomplished by changing the amount of delay in the delay units 58 and 59 so that the pulses from the signal input leads arrive concurrently with the signals from the storage delay loop. Similarly, the padding delay included in delay unit 51, which is employed to produce an integral number of digit periods of delay in the regenerative storage loop, would be reduced slightly to compensate for the slight delays in the logic circuitry.

Figure 6:
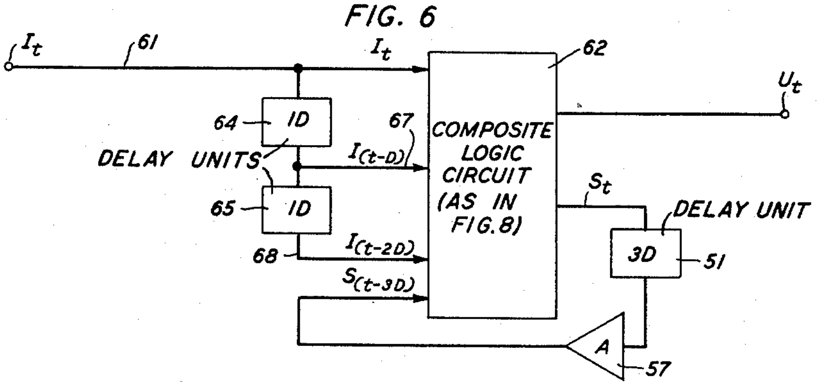
Fig. 6 is a logic circuit in accordance with another specific illustrative embodiment of the invention which performs the same function as that shown in Fig. 5.

Instead of using three circuits 54, 55, and 56 which are actually the same as the circuits of either Fig. 3 or Fig. 4, a single composite circuit may be employed which may be somewhat simpler than the three series connected circuits. Fig. 6 is a diagrammatic showing of a composite logic circuit which performs the functions of the three logic circuits 54, 55, and 56 of Fig. 5. In Fig. 6 input signals are applied on lead 61 to the composite logic circuit 62 both directly and through delay units 64 and 65 on leads 67 and 68, respectively. The nature of the required composite logic circuit 62 may be determined by straightforward Boolean algebraic manipulation, starting with the Boolean expressions for $U_t$ and $S_t$ in terms of $I_t$ and $S_{(t-D)}$, as set forth in Equations 1 and 2. However, $S_{(t-D)}$ is not available to us. Substitutions must therefore be made in which the appropriate expressions involving $S_{(t-3D)}$, $I_{(t-2D)}$, $I_{(t-D)}$, and $I_t$ are substituted for $S_{(t-D)}$. The resulting Boolean expressions are as follows:

$$U_t = I_t I_{(t-D)} I'_{(t-2D)} S'_{(t-3D)} + I_t I_{(t-D)} I_{(t-2D)} S_{(t-3D)} + I_t I'_{(t-D)} I_{(t-2D)} S'_{(t-3D)} + I_t I'_{(t-D)} I'_{(t-2D)} S_{(t-3D)} \quad (3)$$

$$U_t = I_t [I_{(t-D)} I'_{(t-2D)} S'_{(t-3D)} + I_{(t-D)} I_{(t-2D)} S_{(t-3D)} + I'_{(t-D)} I_{(t-2D)} S'_{(t-3D)} + I'_{(t-D)} I'_{(t-2D)} S_{(t-3D)}] \quad (4)$$

$$S_t = I_t I'_{(t-D)} I'_{(t-2D)} S'_{(t-3D)} + I_t I'_{(t-D)} I_{(t-2D)} S_{(t-3D)} + I_t I_{(t-D)} I_{(t-2D)} S'_{(t-3D)} + I_t I_{(t-D)} I'_{(t-2D)} S_{(t-3D)} + I'_t I_{(t-D)} I'_{(t-2D)} S'_{(t-3D)} + I'_t I_{(t-D)} I_{(t-2D)} S_{(t-3D)} + I'_t I'_{(t-D)} I_{(t-2D)} S'_{(t-3D)} + I'_t I'_{(t-D)} I'_{(t-2D)} S_{(t-3D)} \quad (5)$$

Figures 7, 9, 10:
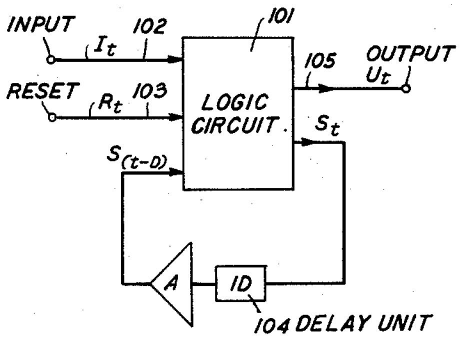
Fig. 7 is the definitive specification of the circuit of Fig. 6.
Fig. 9 is a logic circuit including two input signals and a regenerative storage loop, in accordance with still another specific embodiment of the invention.
Fig. 10 is the definitive specification of the circuit of Fig. 9 as used for a count-down operation.

The foregoing expressions when translated into "truth table" form are set forth in Fig. 7. In addition, a suitable circuit in accordance with another embodiment of the invention for instrumenting the Boolean expressions set forth above, and the "truth table" of Fig. 7 are shown in Fig. 8 on sheet four of the drawings.

Figure 8:
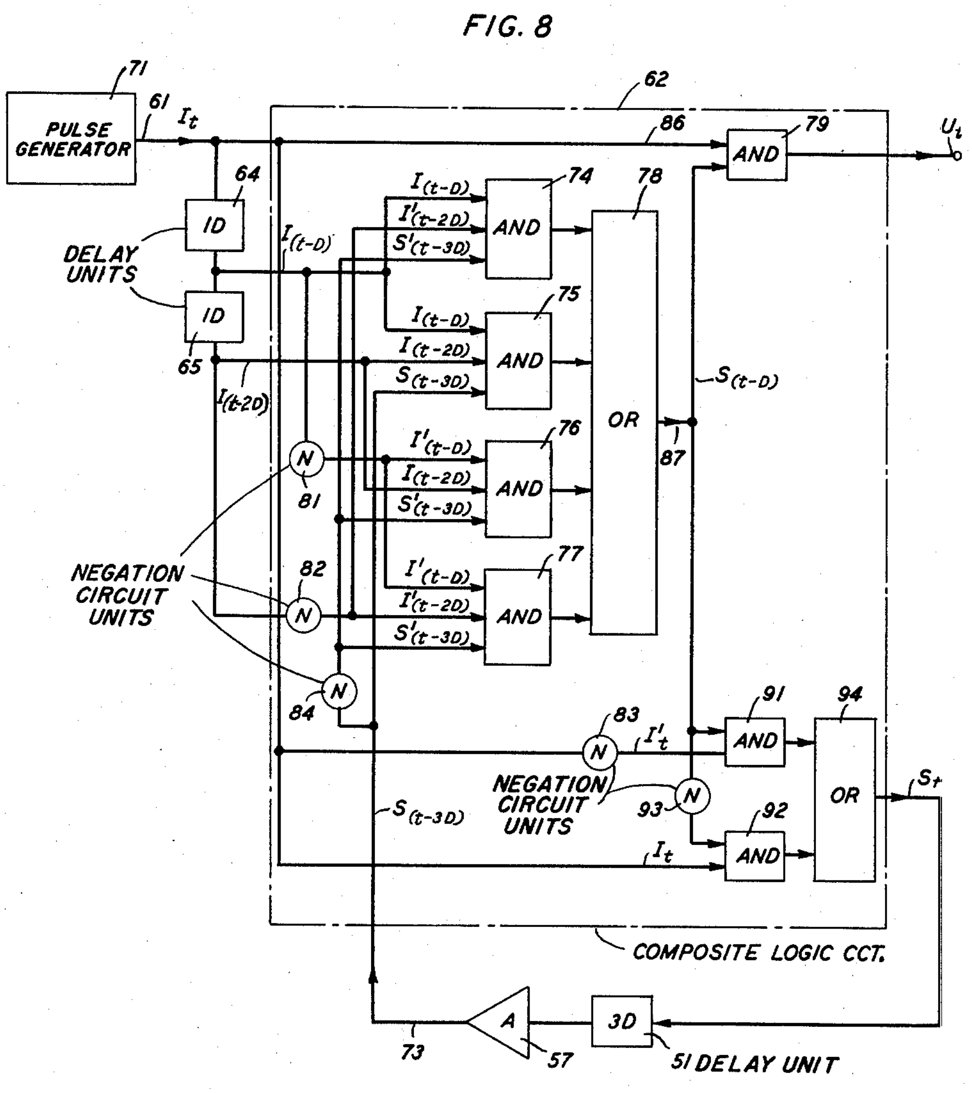
Fig. 8 is an exemplary detailed logic circuit diagram of the specific illustrative embodiment of Fig. 6.

In Fig. 8, the source of binary signals or pulse 71 produces binary output signals $I_t$ during successive digit periods. Relating the circuit of Fig. 8 to Fig. 6, the output from the source 71 is applied to input lead 61. The signals on lead 61 are also connected to the delay units 64 and 65 in Fig. 8, as in Fig. 6. The details of the composite logic circuit 62 which appears in the dashed line box of Fig. 8 will now be considered. The output from the one-digit delay unit 64 may be designated $I_{(t-D)}$. Similarly, the output from the additional one-digit delay unit 65 may be designated $I_{(t-2D)}$. The signal applied to storage is obtained on lead 73 after a delay of three digit periods in the storage regeneration loop. It is therefore designated $S_{(t-3D)}$.

The signals available for use in the composite logic circuit 62 therefore comprise $I_t$, $I_{(t-D)}$, $I_{(t-2D)}$, and $S_{(t-3D)}$. In view of the fact that these are the only symbols included in Equations 4 and 5 for the output $U_t$ and the storage output $S_t$, the logic circuit 62 may clearly be instrumented. The logic elements required for obtaining the signal output $U_t$ include the four AND units 74 through 77, the OR unit 78, and an additional AND unit 79. In addition, the negation circuit units 81 through 84 are required for obtaining the inverse of the four input signals. These inverted or negated signals correspond to the primed terms in Equations 4 and 5. The Equation 4 will now be compared with the logic circuitry connected to produce the signal output $U_t$ in Fig. 8. Recalling that a multiplication operation corresponds to an AND circuit, it may be seen that the common $I_t$ factor in Equation 4 finds its equivalent in the input lead 86 which connects signal $I_t$ to the AND unit 79. Similarly, signals corresponding to each of the three factors of the four terms within the brackets in Equation 4 are applied to the three inputs to the four AND units 74 through 77. The summation of these four factors finds its equivalent in Fig. 8 in the operation performed by the OR unit 78.

From a physical standpoint, it is interesting to note that the signal at the output 87 of the OR unit 78 corresponds to $S_{(t-D)}$, or the signal applied to storage one digit period ago. After noting this fact, it may be seen that the AND unit 79 having inputs $I_t$ and $S_{(t-D)}$ performs exactly the same function as the AND unit 41 in Fig. 4.

In obtaining the signal to storage $S_t$, a full instrumentation of Equation 5 would be possible, employing eight AND units and a final OR unit with eight inputs. However, once it is noted that the signal $S_{(t-D)}$ is available on lead 87, a simpler instrumentation corresponding to that of Fig. 4 is possible. Accordingly, the two AND units 91 and 92, the negation circuit unit 93, and the OR unit 94 are provided to perform the same functions as the AND units 43 and 44, the negation element 46, and the OR unit 45, respectively, of Fig. 4. The circuit of Fig. 8 therefore constitutes a complete logic circuit diagram of the instrumentation of a count-down circuit having three digits of delay in the regenerative storage loop, and which is capable of processing pulses arriving in successive digit periods.

Fig. 9 is a block diagram of a logic circuit 101 having two signal input leads 102 and 103, and a regenerative storage loop including a delay unit 104 having one digit period of delay. The circuit 101 is a count-down circuit which produces one output pulse on lead 105 for every two pulses received on lead 102. In this respect, the circuit 101 operates in substantially the same manner as the circuits of Figs. 3 and 4. However, when pulses are received on the reset input lead 103, no signals appear at the signal output lead 105, and the storage loop is cleared.

Fig. 10 shows a "truth table" for the count-down circuit of Fig. 9 with its resetting control. In Fig. 10, the functions described in the preceding paragraph are set forth in tabular form. Thus, for specific example, the "O's" in the output columns opposite the four last rows of the table indicate the effect of the presence of reset input signals $R_t$ on lead 103.

To illustrate the principles of the invention, it will now be assumed that the regenerative storage loop including the delay unit 104 of Fig. 9 has two digit periods of delay. This could result from increasing the repetition rate of input pulses $I_t$ applied to lead 102 for example, or from the use of a regenerative amplifier having increased delay. To instrument the "truth table" of Fig. 10 without the signal from storage $S_{(t-D)}$ one digit period after it is applied to storage, the principles of Boolean algebra will again be employed. Initially, the expressions for the signal to be applied to storage $S_t$ and the output signal $U_t$ will be set forth in terms which include the signal $S_{(t-D)}$ applied to storage one digit period earlier:

$$S_t=R_t'[I_tS'_{(t-D)}+I_t'S_{(t-D)}] \quad (6)$$

$$U_t=I_tR_t'S_{(t-D)} \quad (7)$$

Now, with the input and reset signals one digit period ago readily available to us $(I_{(t-D)}, R_{(t-D)})$, the following expression for $S_{(t-D)}$ is readily developed from Equation 6 in terms of $I_{(t-D)}$, $R_{(t-D)}$, and $S_{(t-2D)}$:

$$S_{(t-D)}=R'_{(t-D)}[I_{(t-D)}S'_{(t-2D)}+I'_{(t-D)}S_{(t-2D)}] \quad (8)$$

Substituting the value of $S_{(t-D)}$ given in Equation 8 for the term $S_{(t-D)}$ in Equation 7, the following Boolean algebraic expression is obtained for $U_t$:

$$U_t=I_tR_t'R'_{(t-D)}[I_{(t-D)}S'_{(t-2D)}+I'_{(t-D)}S_{(t-2D)}] \quad (9)$$

Similarly, substituting the value of $S_{(t-D)}$ given in expression 8 in Equation 6, the following equations for $S_t$ result:

$$S_t=I_t[I'_{(t-D)}S'_{(t-2D)}+I_{(t-D)}S_{(t-2D)}]R_t' + R_t'I_t'[I_{(t-D)}S'_{(t-2D)}+I'_{(t-D)}S_{(t-2D)}]R_t' \quad (10)$$

$$S_t=I_tI'_{(t-D)}S'_{(t-2D)}R_t'+I_tI_{(t-D)}S_{(t-2D)}R_t' + I_t'I_{(t-D)}S'_{(t-2D)}R_t'+I_t'I'_{(t-D)}S_{(t-2D)}R_t' \quad (11)$$

Figure 11:
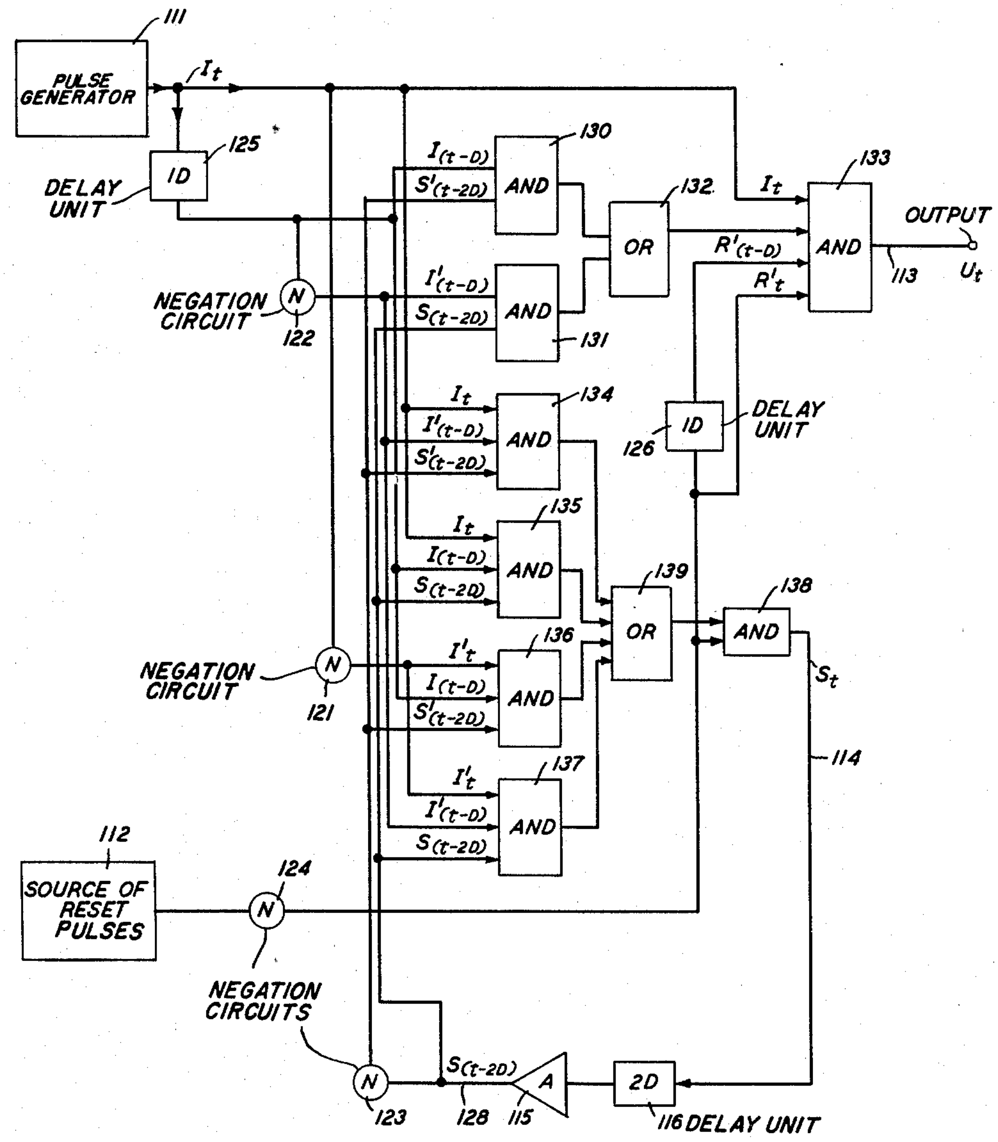
Fig. 11 is an exemplary detailed logic circuit diagram of the specific embodiment of Fig. 9 for instrumenting the "truth table" of Fig. 10 when the regenerative storage loop includes two digit periods of delay.

Fig. 11 represents a circuital realization of Boolean algebraic Expressions 9 and 11 which are set forth above, and constitutes another specific illustrative embodiment of the invention. In Fig. 11, the source of binary signals 111 and the source of reset signals 112 constitute the two input signals to the logic circuit. The signal output $(U_t)$ appears on lead 113 and the signal which is stored during successive digit periods $(S_t)$ is applied to lead 114. The signal regeneration loop includes the amplifier 115 and the associated delay circuit 116. By the use of negation circuits such as those designated 121 through 124, and delay units such as those indicated at 125 and 126, the source of binary signals 111 is available both directly and negated for the present digit period, and also for one digit period past. Similarly, the value of the binary reset signal both for the present digit period and for one digit period past is available in its positive and in its negated form. The signal appearing from the storage delay loop $S_{(t-2D)}$ is also available on lead 128.

Now, recalling that a multiplication operation in Boolean algebra corresponds to the function performed by an AND unit, and that a summation is equivalent to the function performed by an OR circuit, the Expression 9 for $U_t$ can readily be instrumented. Referring first to the two terms in the brackets in Equation 9, the AND circuits 130 and 131 have inputs $I_{(t-D)}$, $S'_{(t-2D)}$, and $I'_{(t-D)}$, $S_{(t-2D)}$, respectively. In addiiton, the OR circuit 132 combines the output signals from the AND units 130 and 131. The additional AND circuit 133 has four inputs corresponding to the four factors of Equation 9, and therefore produces the desired output signal $U_t$ at lead 113. Similarly, the circuit including the five AND units 134 through 138 and the OR unit 139 constitutes a logic circuit realization of Equation 11. In this regard, it may be noted that the location of the AND circuit 138 following the OR circuit 139 corresponds to factoring the $R_t'$ term from each of the four terms in Equation 11. Thus, the output from the OR circuit 139, as well as the negated value of the reset signal at the present time, are both applied to the AND circuit 138.

In connection with Figs. 9 through 11, it has been demonstrated that the present invention is applicable to multiple input logic circuits as well as to those having but a single input. Similarly, it is clear that the principles of the invention are applicable to digital systems having radices other than two. Thus, for example, the present invention is applicable to ternary or decimal systems, as well as to binary logic circuits.

In the foregoing description, several specific examples of logic circuits having regenerative delay loops including several digit periods of delay have been considered. In generalized terms, the analysis presented of these circuits can be represented mathematically by the following expressions:

$$U_t=U_1(I_t, S_{(t-D)}) \quad (12)$$

$$S_t=S_1(I_t, S_{(t-D)}) \quad (13)$$

In the foregoing expressions, $U_t$ and $S_t$ are the signal and storage output signals, respectively; $U_1$ and $S_1$ represent combinational logic circuit functions; $I_t$ is the input digital signal at a reference time; and $S_{(t-D)}$ is the digital signal applied to storage one digit period prior to the reference time. However, assuming that $S_{(t-D)}$ is not available, but that $S_{(t-2D)}$ is available, then the expression for $S_{(t-D)}$ is as follows:

$$S_{(t-D)}=S_1(I_{(t-D)}, S_{(t-2D)}) \quad (14)$$

Accordingly, the expression for $U_t$ may be obtained by combining Equations 12 and 14 as follows:

$$U_t=U_1[I_t, S_1(I_{(t-D)}, S_{(t-2D)})] \quad (15)$$

Similarly, the expression for $S_t$ in terms of $S_{(t-2D)}$, $I_t$, and $I_{(t-D)}$ may be obtained by combining Equations 13 and 14:

$$S_t=[I_t, S_1(I_{(t-D)}, S_{(t-2D)})] \quad (16)$$

If the regenerative storage loop includes three digit periods of delay, $S_{(t-3D)}$ is available to us, but neither $S_{(t-D)}$ nor $S_{(t-2D)}$ is available. The expression for the signal output $U_t$ is then as follows:

$$U_t=U_1[I_t, S_1(I_{(t-D)}, S_1(I_{(t-2D)}, S_{(t-3D)}))] \quad (17)$$

In the foregoing Equation 17, the expression $S_1(I_{(t-2D)}, S_{(t-3D)})$ is of course equal to $S_{(t-2D)}$, and then $S_1(I_{(t-D)}, S_{(t-2D)})$ is equal to $S_{(t-D)}$. So Equation 17 is merely a mathematical representation of the logic circuits of either Fig. 5 or 6, and the successive internal parentheses or brackets may be considered to correspond to the successive logic operations performed by the logic circuits 54, 55, and 56 of Fig. 5. However, the mathematical statement 17 also encompasses the circuit of Fig. 6 in which a single combinational logic circuit 62 is substituted for the plurality of logic circuits of Fig. 5. The equivalence of the circuits of Figs. 5 and 6 was made clear hereinabove in the examples in which the Boolean algebraic expression for a circuit of the type shown in Fig. 5 was transformed into an expression for the circuit of Fig. 6 by straightforward algebraic manipulation.

In Equations 15 and 17, the expressions for the output signal $U_t$ were presented for the cases in which the storage loop includes two or three digit periods of delay, respectively. The following expressions for the output signal $U_t$ and the signal to storage $S_t$ apply to the generalized case when the storage loop includes $p$ digit periods of delay:

$$U_t=U_1[I_t,S_1(I_{(t-D)},S_1(I_{(t-2D)} \dots S_1(I_{(t-pD+D)},S_{(t-pD)}) \dots))] \quad (18)$$

$$S_t=S_1[I_t,S_1(I_{(t-D)},S_1(I_{(t-2D)} \dots S_1(I_{(t-pD+D)},S_{(t-pD)}) \dots))] \quad (19)$$

Equation 18 is merely an extension of Equations 15 and 17. Thus, for example, Equation 18 would be identical with Equation 17 if the symbol $p$ in Equation 18 was the digit 3. Equation 19 is the generalized expression for the signal to storage $S_t$ corresponding to the Equation 16.

It is to be understood that the above-described arrangements are illustrative of the application of the principles of the invention. Numerous other arrangements may be devised by those skilled in the art without departing from the spirit and scope of the invention.

What is claimed is:

1. In a serial data processing circuit for performing a logic operation which depends on digital information applied to a storage loop during the preceding digit period, a logic circuit for processing digital information applied to it in successive digit periods, said logic circuit having at least three inputs and a storage output, a pulse regenerator connected from said storage output to an input of said logic circuit, the delay of the storage loop including said regenerator being equal to an integral plurality of digit periods, at least one source of digital signal information, means for connecting said source of digital signal information directly to another of the inputs of said logic circuit and through delay circuits having integral digit periods of delay to at least one additional input of said logic circuit, the number of connections having different input delays to said logic circuit from said source being equal to the number of digit periods of delay in said regeneration loop, and said logic circuit including means for effectively reconstructing the digital signals appearing at said storage output at each integral digit period after they appear at said storage output.

2. In a serial data processing circuit in which digital signal information is presented in successive digit periods, a logic circuit having a signal output and a memory output, a pulse regenerator having a delay of more than one digit period connected from said memory output to an input of said logic circuit, a source of digital signal information, means for connecting said source of digital signal information directly to another input of said logic circuit and through delay circuits to at least one additional input of said logic circuit, and said logic circuit including means for reconstructing binary signals applied to said memory output one digit period after they are applied to said memory output.

3. In combination, a logic circuit having signal and storage outputs and at least two signal inputs and a storage input, means for applying digital signals directly to one of said signal inputs in successive digit periods, a digital signal regenerator having more than one digit period of delay interconnecting said storage output and storage input to form a storage loop having an integral number of digit periods of delay, and a one-digit delay unit interconnecting said two signal inputs.

4. In a serial data processing circuit for performing a logic operation which depends on digital information applied to a storage loop during the preceding digit period, a logic circuit for processing digital information applied to it in successive digit periods, said logic circuit having at least three signal inputs and a storage output, a pulse regenerator connected from said storage output to an input of said logic circuit, the delay of the storage loop including said regenerator being equal to an integral plurality of digit periods, at least one source of digital signal information, means for connecting said source of digital signal information directly to another input of said logic circuit and through at least one delay circuit to at least one additional input of said logic circuit, the number of connections having different input delays to said logic circuit from said source being equal to the number of digit periods of delay in said regeneration loop, and said logic circuit including means for accomplishing said logic operation by effectively reconstructing the digital signals appearing at said storage output at each integral digit period after they appear at said storage output.

5. A combination as set fourth in claim 4 wherein said storage loop includes at least three digit periods of delay.

6. In a serial data processing circuit in which digital signal information is presented in successive digit periods, a logic circuit having a signal output and a memory output, a pulse regenerator having a delay of more than one digit period connected from said memory output to an input of said logic circuit, a source of digital signal information, means for connecting said source of digital signal information directly to another input of said logic circuit and through delay circuits to at least one additional input of said logic circuit, said logic circuit including means for combining the delayed input signals and signals from storage to reconstruct binary signals applied to said memory output one digit period after they are applied to said memory output, and said logic circuit also including means for combining said reconstructed signals and the current signal input to form the signal output and the new signal to be stored.

7. In a serial data processing circuit for performing a logic operation which depends on digital information applied to a storage loop during the preceding digit period, a logic circuit for processing digital information applied to it in successive digit periods, said logic circuit having at least five inputs and a storage output, a pulse regenerator connected from said storage output to an input of said logic circuit, the delay of the storage loop including said regenerator being equal to an integral plurality of digit periods, two sources of digital signal information, means for connecting said sources of digital signal information directly to respective inputs of said logic circuit and through delay circuits to additional inputs of said logic circuit, the number of connections having different input delays to said logic circuit from each of said sources being equal to the number of digit periods of delay in said regeneration loop, and said logic circuit including means for accomplishing said logic operation by effectively reconstructing the digital signals applied to said storage output at each integral digit period after they are applied to said storage ouput.

8. A count-down circuit comprising a source for supplying binary signals during successive digit periods, logic circuit means for producing one output pulse when a preassigned number of input pulses are supplied by said source, said logic circuit means having at least three inputs and a storage output, a pulse regenerator connected from said storage output to an input of said logic circuit, the storage loop including said pulse regenerator having at least two digit periods of delay, and means for connecting said source of signal information directly to one of said inputs and through a delay circuit having an integral number of digit periods of delay to another input of said logic circuit.

9. A combination as set forth in claim 8 wherein an additional source of binary signals is connected both directly and through a delay unit to said logic circuit.

10. In a serial data processing circuit for performing a logic operation which depends on digital information applied to a storage loop during the preceding digit period, a logic circuit for processing digital information applied to it in successive digit periods, said logic circuit having at least three inputs and a storage output, a pulse regenerator connected from said storage output to an input of said logic circuit, the delay of the storage loop including said regenerator being equal to an integral plurality of digit periods, at least one source of digital signal information, and means for connecting said source of digital signal information directly to another of the inputs of said logic circuit and through delay circuits having integral digit periods of delay to at least one additional input of said logic circuit, the number of connections having different input delays to said logic circuit from said source being equal to the number of digit periods of delay in said storage loop.

11. A combination as defined in claim 10 wherein said storage loop includes at least three digit periods of delay.

12. An electrical circuit comprising a source of input pulses which occur in spaced digit intervals, logic circuit means having one input connected to said source and having a pair of outputs, and a regenerative loop connected between one of said outputs and another input of said logic circuit means, said loop having a delay greater than one digit interval, said logic circuit means further comprising a final logic circuit connected to the other of said outputs and to which said input information source is directly connected and a plurality of other logic circuits including delay means, the cumulative delay of which is equal to one digit interval less than the delay of said regenerative loop, said plurality of other logic circuits operating on said input pulses to supply to said final logic circuit pulses for combination in said final logic circuit with said input pulses.

13. An electrical circuit in accordance with claim 12 further comprising means connecting said regenerative loop to said plurality of other logic circuits.

14. An electrical circuit comprising a source of input pulses which occur in spaced digit intervals, logic circuit means including a principal logic circuit and a final logic circuit, said principal logic circuit having at least two inputs and two outputs, said final logic circuit having inputs connected directly to said source and to one of the outputs of said principal logic circuit, a regenerative loop connected between another output and one of the inputs of said principal logic circuit, said loop having a delay greater than one digit interval, and at least one circuit means including delay of at least one digit period connected from said source of input pulses to at least one additional input of said principal logic circuit, the cumulative delay of the last-mentioned circuit means having the greatest delay being equal to one digit period less than the delay of said regenerative loop, said principal logic circuit operating on all of the pulses applied to its inputs to supply to said final logic circuit pulses for combination in said final logic circuit with the undelayed input pulses from said source.

References Cited in the file of this patent

UNITED STATES PATENTS

| | | |
|---|---|---|
| 2,758,787 | Felker | Aug. 14, 1956 |
| 2,758,788 | Yaeger | Aug. 14, 1956 |
| 2,824,228 | Carmichael | Feb. 18, 1958 |

OTHER REFERENCES

Richards-Arithmetic Operations In Digital Computers, D. Van Nostrand Co., Inc., Princeton, N. J., copyright February 1955, page 198.